United States Patent
Ogisu et al.

(10) Patent No.: US 11,428,934 B2
(45) Date of Patent: Aug. 30, 2022

(54) VEHICLE DISPLAY DEVICE

(71) Applicant: Yazaki Corporation, Tokyo (JP)

(72) Inventors: Takuma Ogisu, Shizuoka (JP); Kunimitsu Aoki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 251 days.

(21) Appl. No.: 17/010,767

(22) Filed: Sep. 2, 2020

(65) Prior Publication Data
US 2021/0072538 A1 Mar. 11, 2021

(30) Foreign Application Priority Data
Sep. 5, 2019 (JP) .............................. JP2019-161915

(51) Int. Cl.
| | | |
|---|---|---|
| G09G 1/08 | (2006.01) |
| G02B 27/01 | (2006.01) |
| B60K 35/00 | (2006.01) |
| G02B 3/00 | (2006.01) |
| G03H 1/22 | (2006.01) |
| G03H 1/02 | (2006.01) |

(52) U.S. Cl.
CPC .......... *G02B 27/0103* (2013.01); *B60K 35/00* (2013.01); *G02B 3/0006* (2013.01); *G02B 27/0179* (2013.01); *G03H 1/2202* (2013.01); *B60K 2370/1529* (2019.05); *B60K 2370/23* (2019.05); *B60K 2370/29* (2019.05); *G02B 2027/0181* (2013.01); *G03H 1/0252* (2013.01); *G03H 2001/2231* (2013.01)

(58) Field of Classification Search
CPC .............. G02B 27/0103; G02B 3/0006; G02B 27/0179; B60K 35/00
USPC ........................................................... 345/13
See application file for complete search history.

(56) References Cited

U.S. PATENT DOCUMENTS

| | | | | |
|---|---|---|---|---|
| 5,231,379 A | * | 7/1993 | Wood ..................... | G02B 27/01 359/708 |
| 5,726,782 A | * | 3/1998 | Kato ........................ | G02B 5/32 359/13 |
| 5,781,317 A | * | 7/1998 | Kawazoe ........... | G02B 27/0103 359/13 |
| 5,859,714 A | * | 1/1999 | Nakazawa ........ | B32B 17/10761 359/24 |

(Continued)

FOREIGN PATENT DOCUMENTS

| | | |
|---|---|---|
| CN | 102656501 A | 9/2012 |
| JP | 11-91401 A | 4/1999 |

*Primary Examiner* — Jonathan M Blancha
(74) *Attorney, Agent, or Firm* — Kenealy Vaidya LLP (57) ABSTRACT

A vehicle display device includes a reflection-type hologram disposed inside a windshield of a vehicle, and a projection device including an image display device outputting a display light and a regulating unit configured to regulate a diffusion angle of the display light, and to project the display light having passed through the regulating unit onto the hologram. The hologram outputs the display light projected from the projection device as diffracted light directed to an eye range of the vehicle, and the regulating unit is configured to regulate the diffusion angle of the display light to an upper limit angle or less such that the display light reflected from the windshield is directed in a direction different from the eye range.

14 Claims, 8 Drawing Sheets

(56) References Cited

U.S. PATENT DOCUMENTS

| | | | |
|---|---|---|---|
| 2001/0044010 A1* | 11/2001 | Freeman | B32B 3/02 |
| | | | 428/207 |
| 2012/0250306 A1 | 10/2012 | Sugiyama et al. | |
| 2015/0219803 A1 | 8/2015 | Inamoto et al. | |
| 2019/0285885 A1* | 9/2019 | Satoh | G02B 5/0278 |
| 2021/0026137 A1* | 1/2021 | Yuan | B60K 37/02 |

* cited by examiner

VEHICLE DISPLAY DEVICE

CROSS-REFERENCE TO RELATED APPLICATION(S)

The present application claims priority to and incorporates by reference the entire contents of Japanese Patent Application No. 2019-161915 filed in Japan on Sep. 5, 2019.

BACKGROUND OF THE INVENTION

1. Field of the Invention

The present invention relates to a vehicle display device.

2. Description of the Related Art

Conventional display devices using holograms exist. Japanese Patent Application Laid-open No. H11-91401 discloses a vehicle holographic display device including an information display source generating information to be displayed as light, and a combiner including a hologram disposed in a dark-color concealing portion provided in a peripheral edge portion of a windshield of a vehicle, diffracting light toward the observer, and displaying the light as a virtual image.

When the hologram is disposed inside the windshield, reflection of display light from the surface of the windshield needs to be considered. When the reflected light can be directed in a direction different from the eye range, visibility of the display image can be improved.

SUMMARY OF THE INVENTION

An object of the present invention is to provide a vehicle display device capable of improving visibility of the display image.

In order to achieve the above mentioned object, a vehicle display device according to one aspect of the present invention includes a reflection-type hologram disposed inside a windshield of a vehicle; and a projection device including an image display device outputting a display light and a regulating unit configured to regulate a diffusion angle of the display light, and to project the display light having passed through the regulating unit onto the hologram, wherein the hologram outputs the display light projected from the projection device as diffracted light directed to an eye range of the vehicle, and the regulating unit is configured to regulate the diffusion angle of the display light to an upper limit angle or less such that the display light reflected from the windshield is directed in a direction different from the eye range.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A vehicle display device according to an embodiment of the present invention will be described hereinafter in detail with reference to drawings. The present invention is not limited to the embodiment. In addition, constituent elements in the following embodiment include elements that the skilled person could easily conceive or substantially the same ones.

Embodiment

Figure 1:
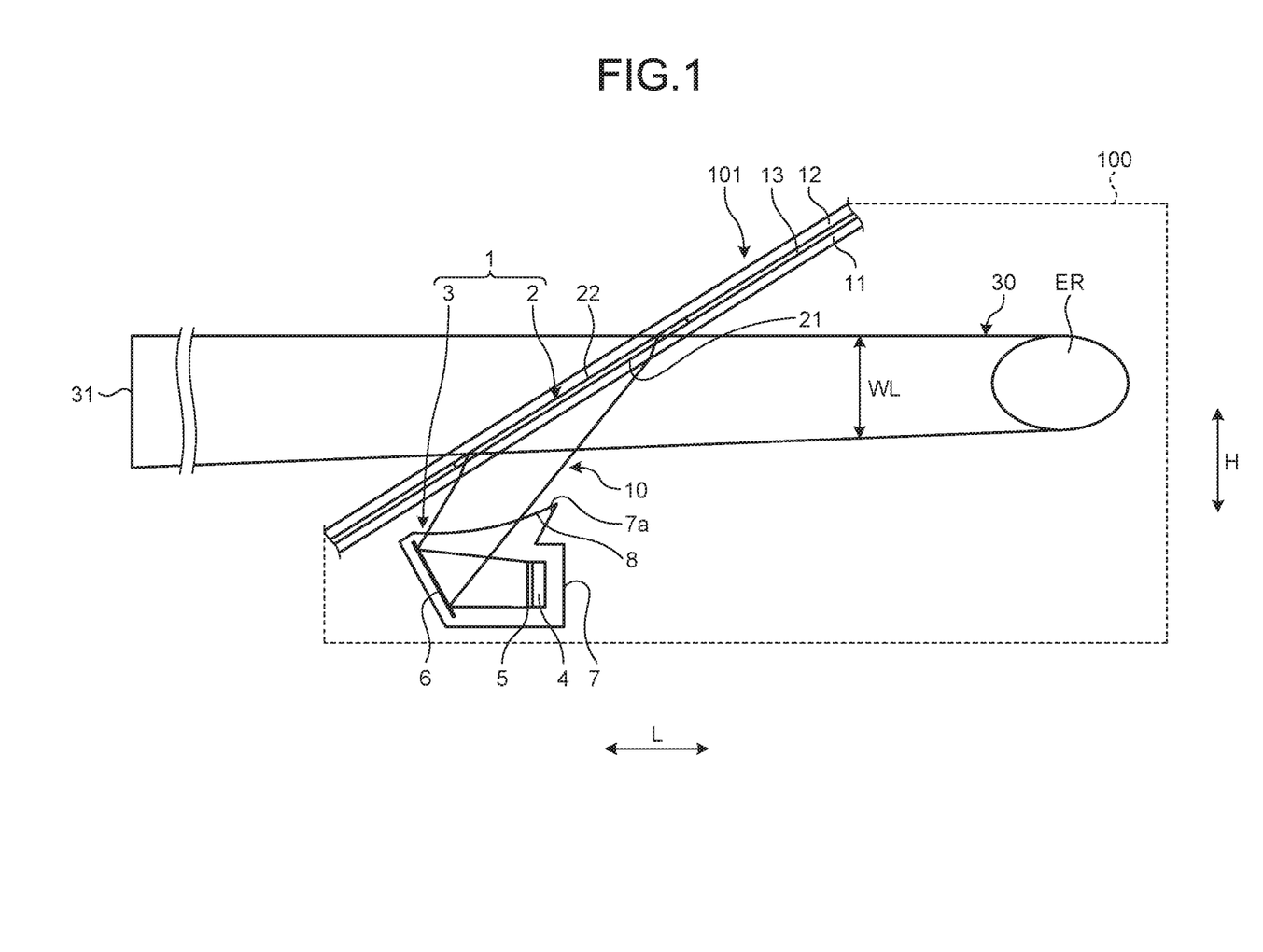
FIG. 1 is a schematic block diagram of a vehicle display device according to an embodiment.
Figure 3:
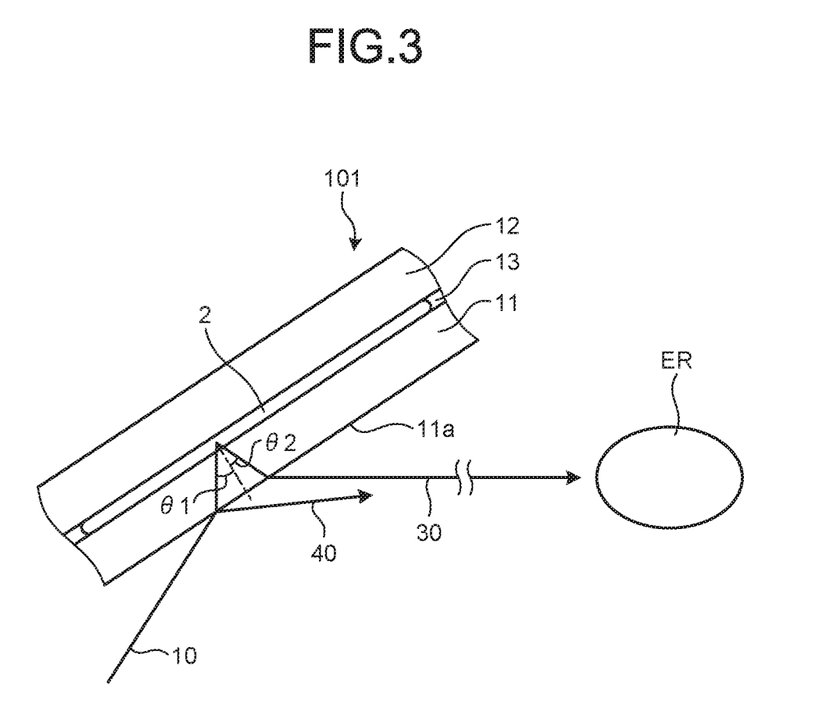
FIG. 3 is a diagram explaining light reflected from a windshield.
Figure 4:
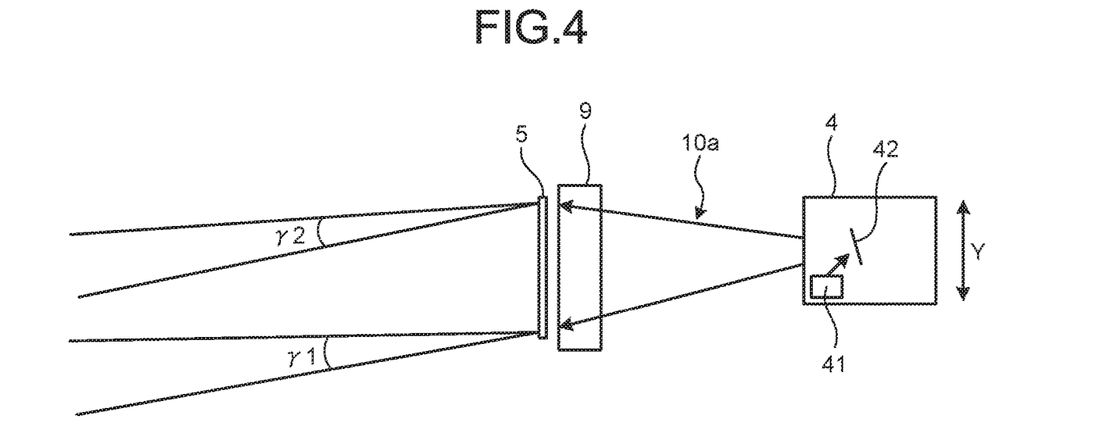
FIG. 4 is a diagram illustrating a structure of a projection device according to the embodiment.
Figure 5:
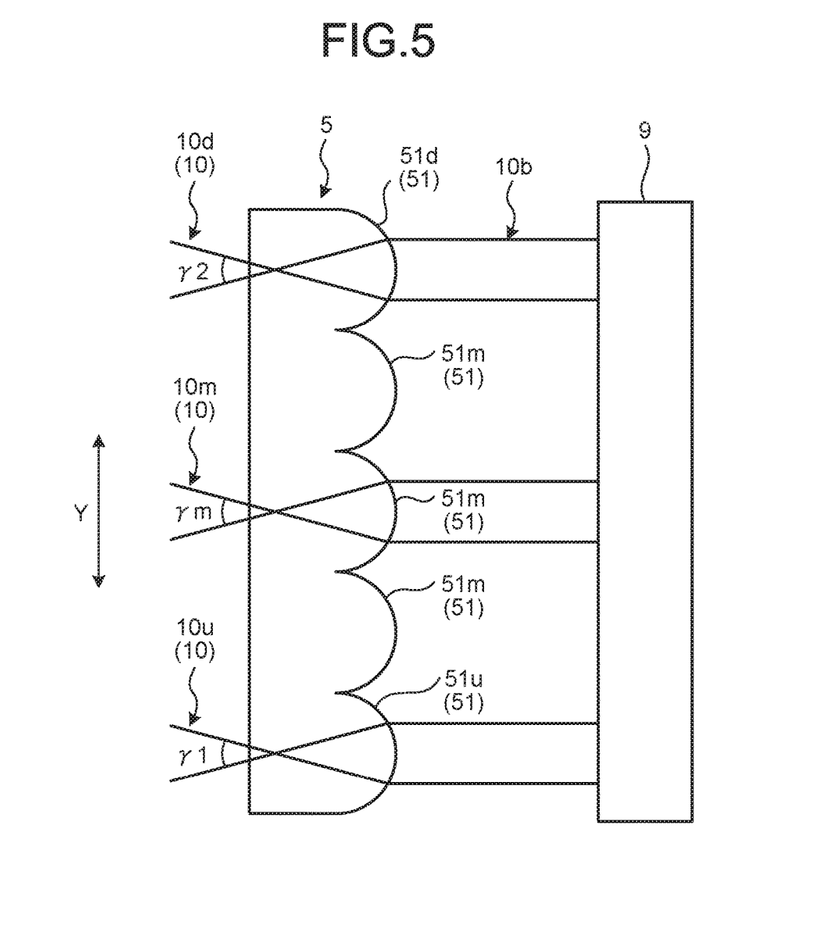
FIG. 5 is a diagram explaining regulation of the diffusion angle with a regulating unit according to the embodiment.
Figure 6:
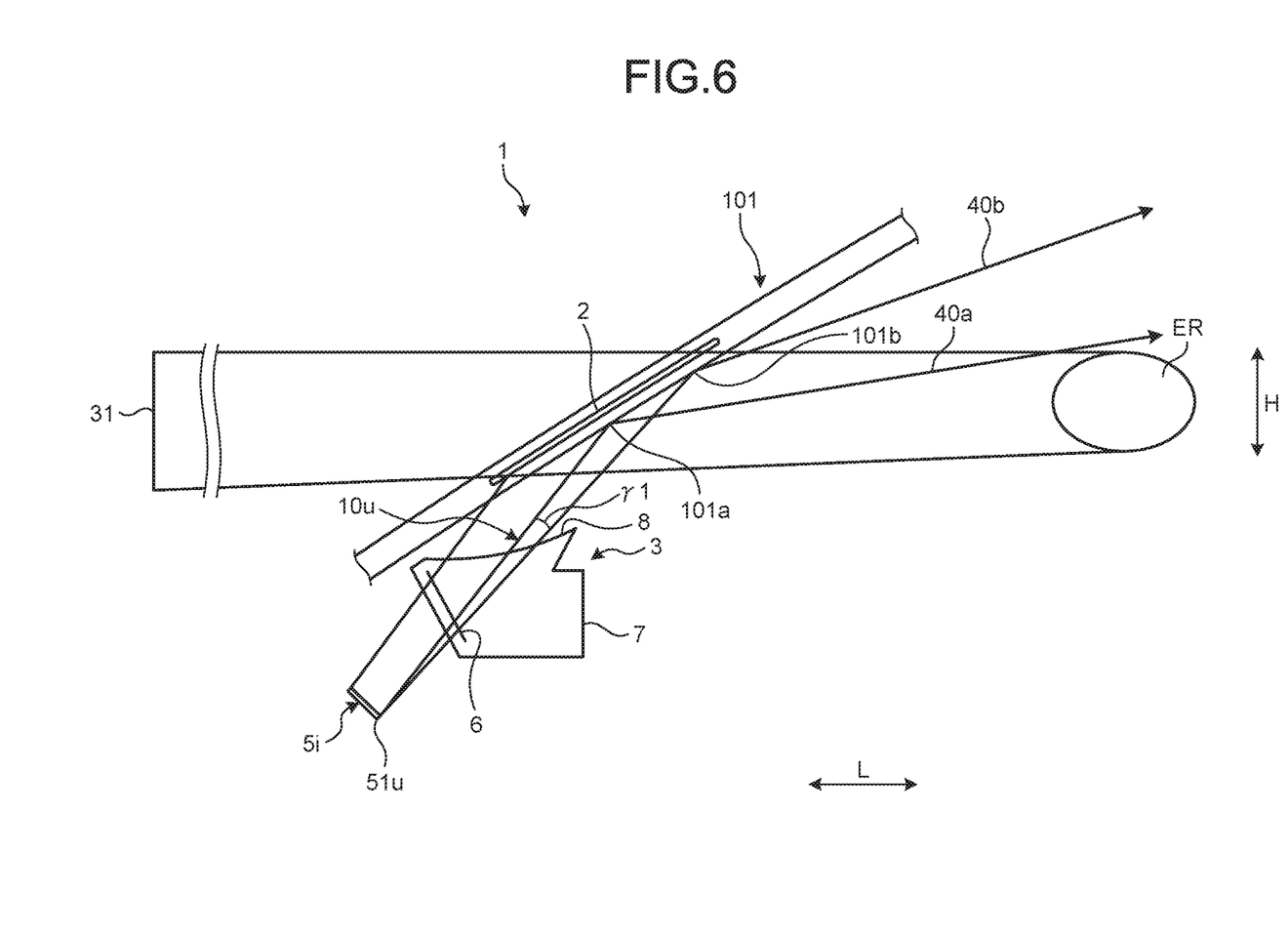
FIG. 6 is an explanatory diagram of reflected light reflected from an upper portion of the windshield.
Figure 7:
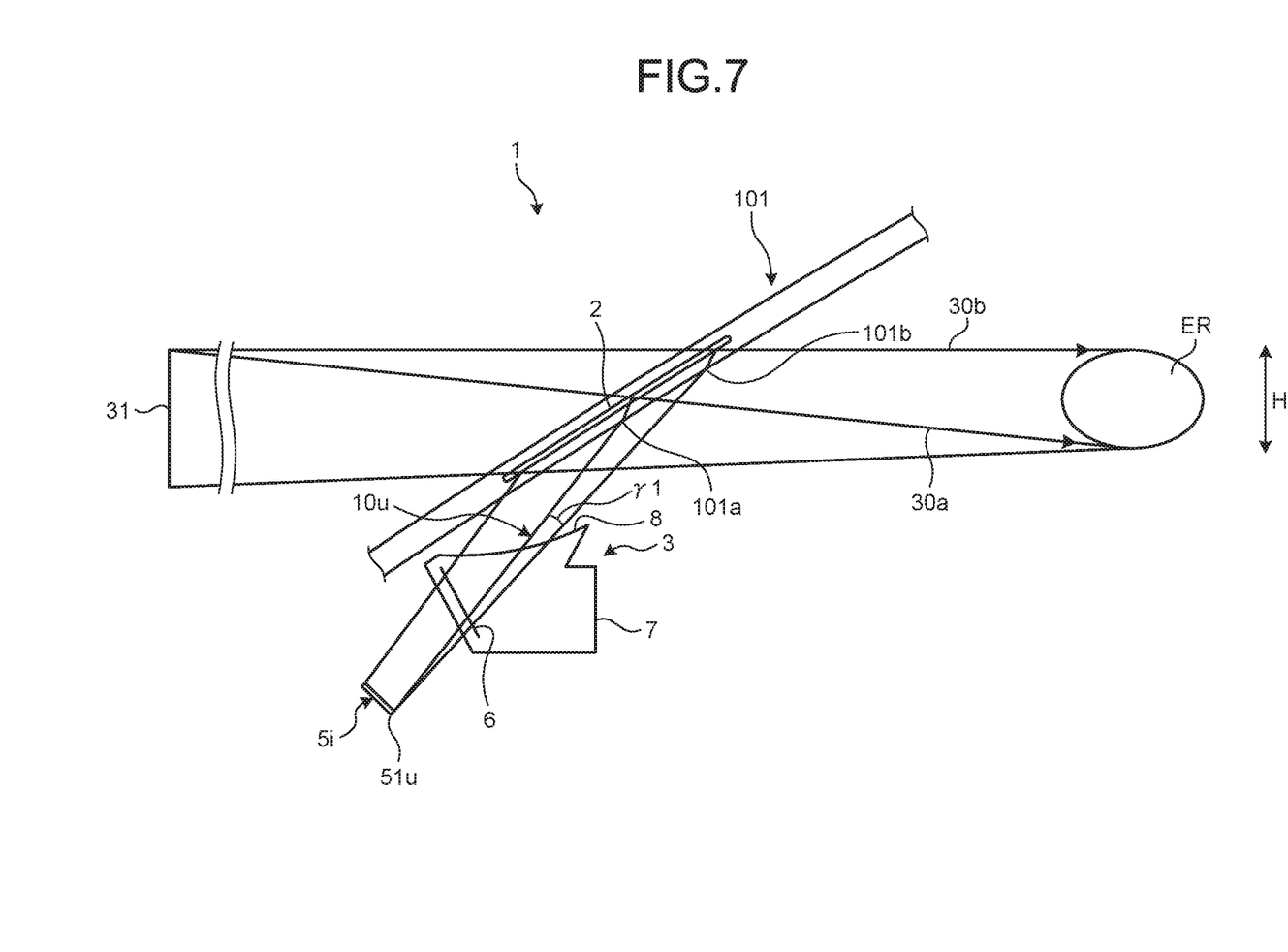
FIG. 7 is an explanatory diagram of diffracted light diffracted in an upper portion of the hologram.
Figure 8:
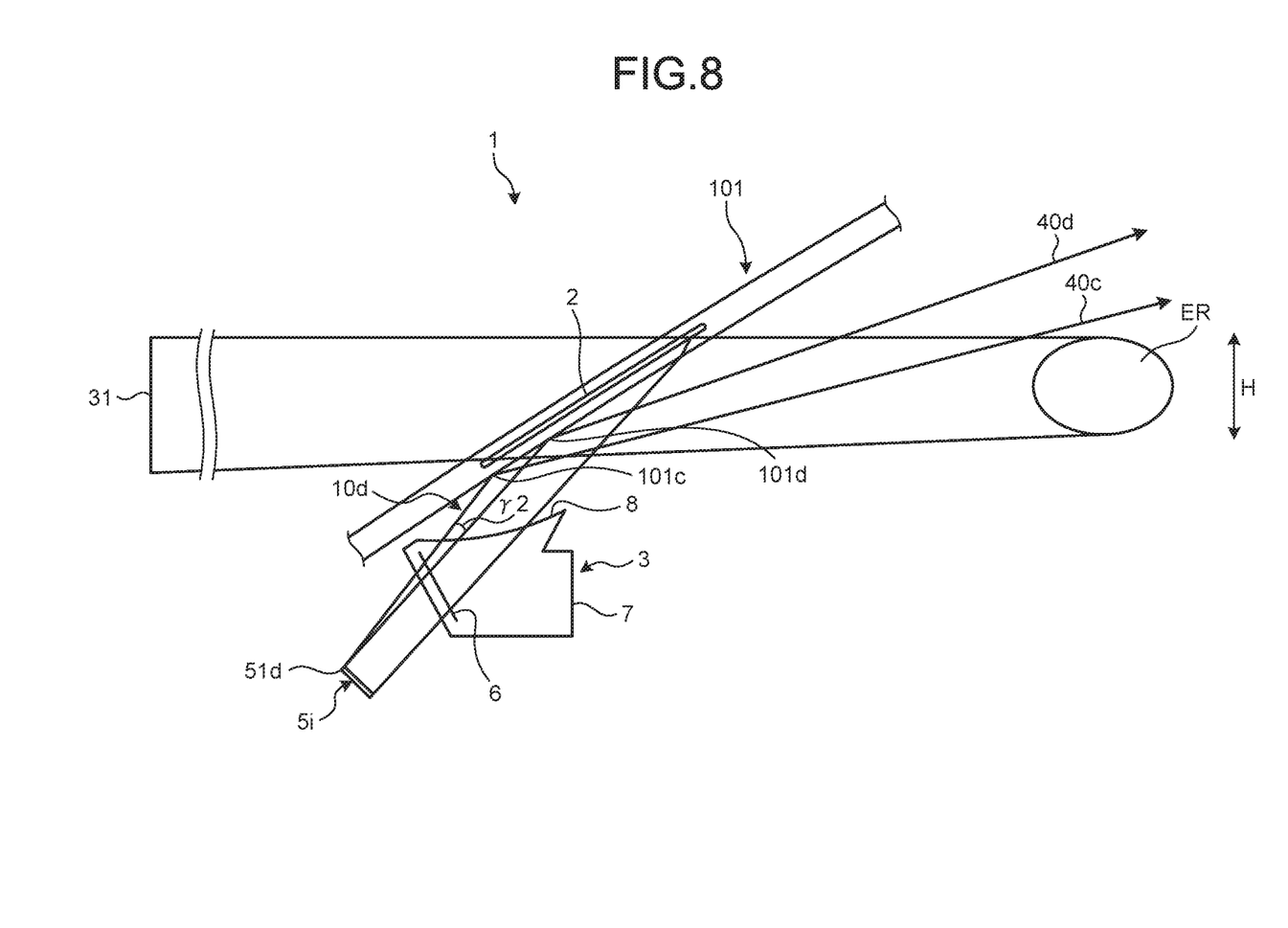
FIG. 8 is an explanatory diagram of reflected light reflected in a lower portion of the windshield.
Figure 9:
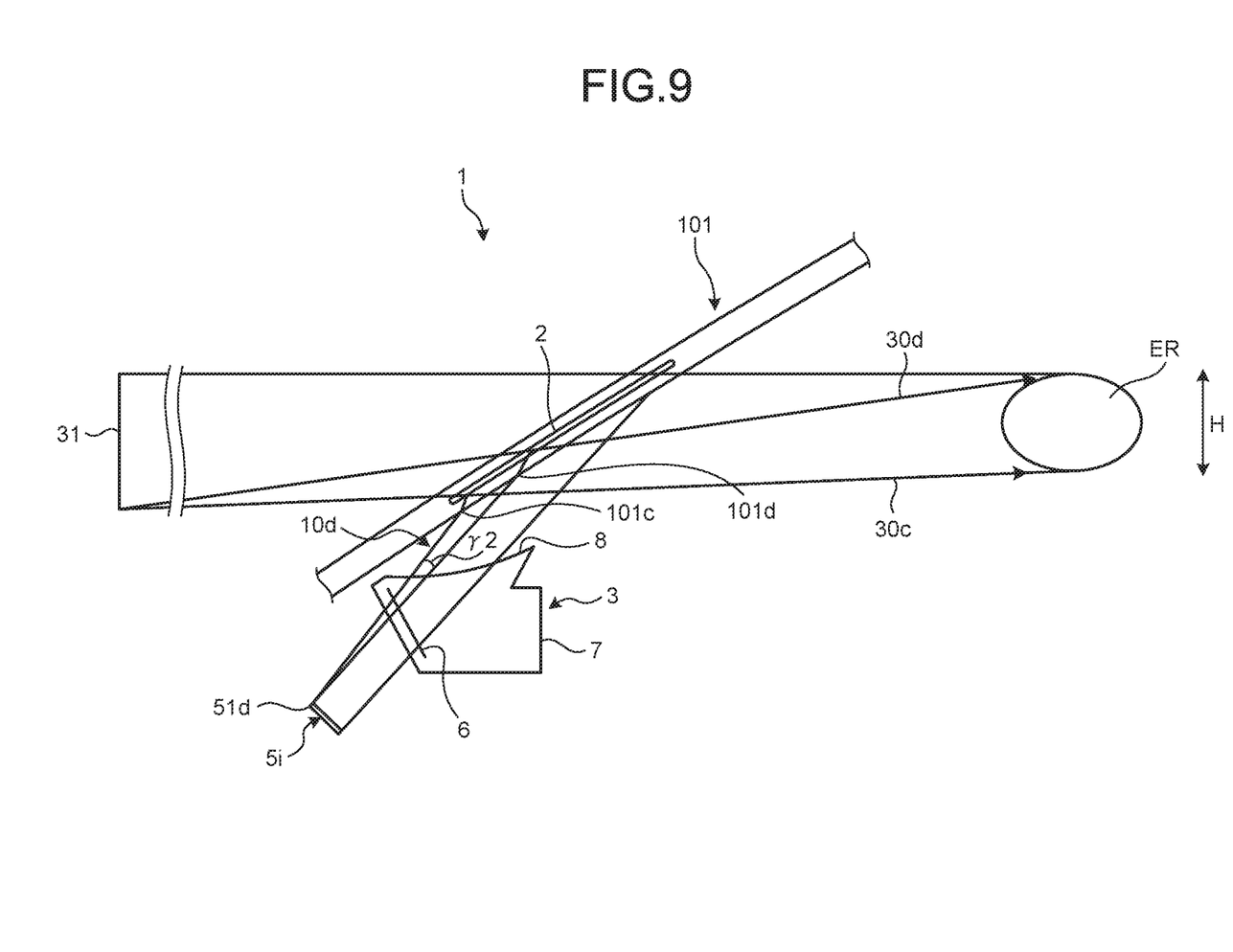
FIG. 9 is an explanatory diagram of diffracted light diffracted in a lower portion of the hologram.
Figure 10:
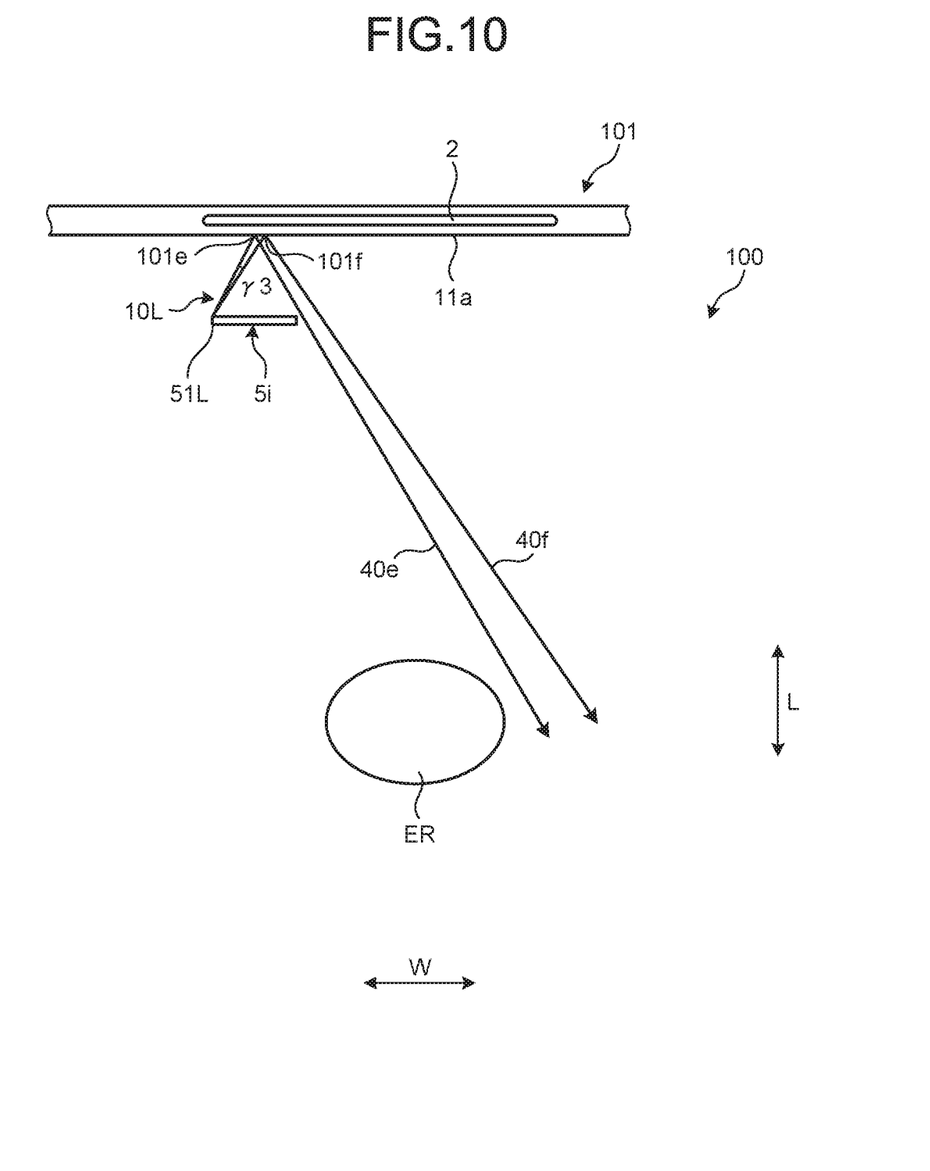
FIG. 10 is a diagram illustrating a structure deflecting the reflected light in a vehicle width direction.

An embodiment will now be described with reference to FIG. 1 to FIG. 10. The present embodiment relates to a vehicle display device. FIG. 1 is a schematic block diagram of a vehicle display device according to an embodiment, FIG. 2 is a diagram explaining diffraction of light with a hologram according to the embodiment, FIG. 3 is a diagram explaining light reflected from a windshield, FIG. 4 is a diagram illustrating a structure of a projection device according to the embodiment, FIG. 5 is a diagram explaining regulation of the diffusion angle with a regulating unit according to the embodiment, FIG. 6 is an explanatory diagram of reflected light reflected in an upper portion of the windshield, FIG. 7 is an explanatory diagram of diffracted light diffracted in an upper portion of the hologram, FIG. 8 is an explanatory diagram of reflected light reflected in a lower portion of the windshield, FIG. 9 is an explanatory diagram of diffracted light diffracted in a lower portion of the hologram, and FIG. 10 is a diagram illustrating a structure deflecting the reflected light in a vehicle width direction.

As illustrated in FIG. 1, a vehicle display device 1 according to the present embodiment is mounted on a vehicle 100, such as an automobile. The vehicle display device 1 includes a hologram 2, and a projection device 3. The hologram 2 is disposed inside a windshield 101 of the vehicle 100. The windshield 101 is laminated glass, and includes internal glass 11, external glass 12, and an intermediate film 13. The intermediate film 13 and the hologram 2 are sealed between the internal glass 11 and the external glass 12. The intermediate film 13 is formed of synthetic resin, such as a polymer. The hologram 2 may be formed, for example, as one unitary piece with the intermediate film 13, or inserted in the intermediate film 13.

The hologram 2 is a transparent film processed to have a desired diffraction characteristic. The hologram 2 according to the present embodiment is a reflection-type hologram. The hologram 2 includes a first surface 21 and a second surface 22. The hologram 2 diffracts light made incident on the first surface 21, and emits the diffracted light from the first surface 21.

Figure 2:
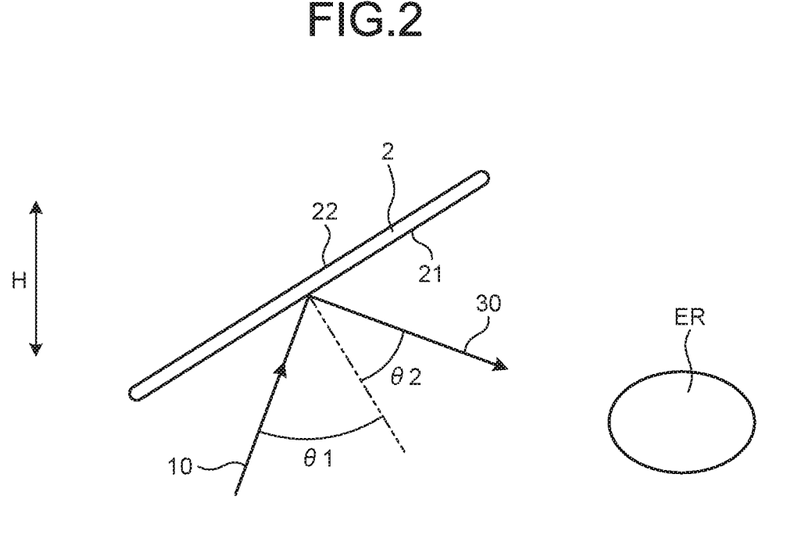
FIG. 2 is a diagram explaining diffraction of light with a hologram according to the embodiment.

As illustrated in FIG. 2, when light is made incident on the first surface 21 at a first angle of θ1, the hologram 2 outputs diffracted light 30 from the first surface 21. The hologram 2 is configured such that the emission angle of the diffracted light 30 is set to a second angle θ2. The second angle θ2 is determined such that the diffracted light 30 is directed to an eye range ER. In the hologram 2 according to the present embodiment, the second angle θ2 is smaller than the first angle θ1. This structure causes the emission angle θ2 of the diffracted light 30 to deviate from the emission angle of reflected light 40 described later, and enables the reflected light 40 to be easily deflected from the eye range ER. The eye range ER is a region supposed to be the driver's eye position in the vehicle 100. In the hologram 2 according to the present embodiment, the first angle θ1 and the second angle θ2 differ according to the position along a height position H. The hologram 2 is configured to condense the diffracted light 30 toward the eye range ER, as described later.

When the incidence angle of the light with respect to the first surface 21 is different from the first angle θ1, the hologram 2 transmits the light. Specifically, the hologram 2 selectively reflects light made incident thereon at the first angle 61 toward the eye range ER. The hologram 2 also transmits light made incident on the second surface 22 toward the eye range ER side.

As illustrated in FIG. 1, the projection device 3 includes a housing 7, an image display device 4, a regulating unit 5, a mirror 6, and a cover 8. The housing 7 is, for example, disposed inside a dashboard of the vehicle 100. The housing 7 includes an opening portion 7a, and fixed in the vehicle 100, with the opening portion 7a directed upward. The dashboard is provided with an opening corresponding to the opening portion 7a of the housing 7.

The image display device 4, the regulating unit 5, and the mirror 6 are contained inside the housing 7. The cover 8 closes the opening portion 7a of the housing 7. The cover 8 is a transparent member, and transmits display light 10.

The image display device 4 is a device outputting display light. The image display device 4 according to the present embodiment is a laser scanner. The regulating unit 5 is a member of an optical system regulating the diffusion angle of the display light 10. The mirror 6 is a reflection device reflecting the display light 10 output from the image display device 4 via the regulating unit 5 toward the hologram 2. The mirror 6 according to the present embodiment is a magnifying mirror. The shape of the reflecting surface of the mirror 6 is a free-form surface, and the mirror 6 magnifies the display light 10 and reflects the display light 10 toward the hologram 2. Specifically, the projection device 3 projects display light 10 with the regulated diffusion angle onto the first surface 21 of the hologram 2.

As illustrated in FIG. 1, the hologram 2 outputs the display light 10 made incident from the mirror 6 as diffracted light 30 directed to the eye range ER. When the user views the hologram 2 from the eye range ER, a display image 31 is visually recognized with the diffracted light 30. The display image 31 is a virtual image visually recognized by the user with the diffracted light 30. The display image 31 is formed ahead of the hologram 2 in a vehicle front-and-rear direction L as viewed from the user.

The hologram 2 according to the present embodiment has a diffraction characteristic of condensing the diffracted light 30 to the eye range ER. For example, the width WL of the diffracted light 30 directed to the eye range ER narrows as the diffracted light 30 goes from the hologram 2 toward the eye range ER. The width WL is the width of the diffracted light 30 in the height direction H. The hologram 2 may be configured to also narrow the width of the diffracted light 30 in the vehicle width direction as the diffracted light 30 goes toward the eye range ER. The hologram 2 according to the present embodiment is capable of magnifying the display image 31 to cause the user to visually recognize the display image 31.

As illustrated in FIG. 3, part of the display light 10 is reflected from the windshield 101. FIG. 3 illustrates the diffracted light 30 and reflected light 40. When the display light 10 is made incident on a vehicle-interior side surface 11a of the internal glass 11, most of the display light 10 is transmitted through the internal glass 11. The transmitted light is diffracted by the hologram 2, and output as the diffracted light 30 toward the eye range ER. By contrast, part of the display light 10 is reflected from the vehicle-interior side surface 11a, and serves as the reflected light 40. When the display light 10 is reflected toward the eye range ER, a ghost is generated with the reflected light 40, and visibility of the display image 31 is deteriorated.

The vehicle display device 1 according to the present embodiment is capable of suppressing generation of a ghost due to the reflected light 40, and improving the visibility of the display image 31, as described later. Specifically, the regulating unit 5 regulates the diffusion angle of the display light 10 to prevent generation of the reflected light 40 directed to the eye range ER.

As illustrated in FIG. 4, the light output from the image display device 4 is made incident on the regulating unit 5 via a field lens 9. The image display device 4 includes a light source 41 emitting laser light, and a movable mirror 42 reflecting the laser light. The image display device 4 scans the laser light in an image vertical direction Y and an image horizontal direction X by oscillating the mirror 42. The image horizontal direction X is a horizontal direction in the case where the display image 31 is viewed from the eye range ER, and the image vertical direction Y is a vertical direction in the case where the display image 31 is viewed from the eye range ER. The image horizontal direction X in FIG. 4 is a direction orthogonal to the paper surface. Display light 10a output from the image display device 4 is made incident on the field lens 9.

The field lens 9 is a lens aligning the light traveling directions. The field lens 9 aligns the display light 10a made incident from the image display device 4 into substantially parallel light, and outputs the light toward the regulating unit 5. As illustrated in FIG. 5, the regulating unit 5 according to the present embodiment is a microlens array including a plurality of lenses 51. The lenses 51 diffuse display light 10b made incident from the field lens 9. The display light 10 diffused by the regulating unit 5 is reflected from the mirror 6 toward the hologram 2. The regulating unit 5 according to the present embodiment is a screen, and diffuses the display light 10 such that the display image 31 can be visually recognized from any position in the eye range ER.

The lenses 51 are arranged along the image vertical direction Y. A cross-sectional shape of each of the lenses 51 on a cross section orthogonal to the optical axis is, for example, a substantially circular shape. The lenses 51 of this shape are arranged along the image vertical direction Y and the image horizontal direction X. The lenses 51 are arranged, for example, in a lattice manner. In the lenses 51, a lens 51u is a lens corresponding to an upper portion of the display image 31. Display light 10u diffused through the lens 51u is projected onto an upper portion of the hologram 2. A lens 51d is a lens corresponding to a lower portion of the display image 31. Display light 10d diffused through the lens 51d is projected onto a lower portion of the hologram 2. Lenses 51m are lenses corresponding to a middle portion between the upper portion and the lower portion of the display image 31.

The lenses 51 refract and diffuse the display light 10b made incident from the field lens 9. Each of the lenses 51 is formed in a shape regulating the diffusion angle of the output display light 10 to an upper light angle or less. In the regulating unit 5 according to the present embodiment, the value of an upper limit angle $\gamma 1$ of the lens 51u is different from the value of an upper limit angle $\gamma 2$ of the lens 51d. The value of an upper limit angle $\gamma m$ of the lenses 51m is set to, for example, a value between the upper limit angle $\gamma 1$ and the upper limit angle $\gamma 2$. The curvature and the like of each of the lenses 51 are determined such that each of the lenses 51 has a desired diffusion characteristic.

The upper limit angles $\gamma 1$, $\gamma 2$, and $\gamma m$ are determined such that the display light 10 reflected from the windshield 101 is directed in a direction different from the eye range ER, as described below. The display light 10u projected onto the upper portion of the hologram 2 will be described hereinafter with reference to FIG. 6. FIG. 6 illustrates a virtual screen 5i. The virtual screen 5i is a virtual image display surface. The virtual screen 5i is, for example, in a position of an image visually recognized when the mirror 6 is directly viewed from above. The display light 10u illustrated in FIG. 6 is display light 10 diffused through the lens 51u. The display light 10u is diffused at a diffusion angle equal to or smaller than the upper limit angle $\gamma 1$.

The display light 10u is made incident on the windshield 101 within a range extending from a lower point 101a to an upper point 101b. Part of the display light 10u made incident on the lower point 101a of the windshield 101 is reflected from the windshield 101 and serves as reflected light 40a. In addition, part of the display light 10u made incident on the upper point 101b of the windshield 101 is reflected from the windshield 101 and serves as reflected light 40b. The upper limit angle $\gamma 1$ of the present embodiment is set such that the display light 10u made incident on the range extending from the lower point 101a to the upper point 101b is reflected toward a position upper than the eye range ER. In this manner, when the display light 10u is reflected from the windshield 101, the display light 10u is reflected in a direction different from the eye range ER. In other words, the regulating unit 5 regulates the diffusion angle of the display light 10u to the upper limit angle $\gamma 1$ or less such that the display light 10u reflected from the windshield 101 is directed in a direction different from the eye range ER.

In addition, as explained with reference to FIG. 7, the upper limit angle $\gamma 1$ is determined such that the display image 31 can be visually recognized from all the positions in the eye range ER. As illustrated in FIG. 7, part of the display light 10u made incident on the lower point 101a of the windshield 101 is transmitted through the windshield 101, diffracted by the hologram 2, and serves as diffracted light 30a. The diffracted light 30a is output toward the lower end of the eye range ER. By contrast, part of the display light 10u made incident on the upper point 101b of the windshield 101 is transmitted through the windshield 101, diffracted by the hologram 2, and serves as diffracted light 30b. The diffracted light 30b is output toward the upper end of the eye range ER. Specifically, the upper limit angle $\gamma 1$ is determined such that the diffracted light 30 generated from the display light 10u can be visually recognized from the whole range extending from the upper end to the lower end of the eye range ER.

The display light 10d projected onto the lower portion of the hologram 2 will be explained hereinafter with reference to FIG. 8. The display light 10d illustrated in FIG. 8 is display light 10 diffused through the lens 51d. The display light 10d is diffused at a diffusion angle equal to or smaller than the upper limit angle $\gamma 2$.

The display light 10d is made incident on the windshield 101 within a range extending from a lower point 101c to an upper point 101d. Part of the display light 10d made incident on the lower point 101c of the windshield 101 is reflected from the windshield 101, and serves as reflected light 40c. In addition, part of the display light 10d made incident on the upper point 101d of the windshield 101 is reflected from the windshield 101, and serves as reflected light 40d. The upper limit angle $\gamma 2$ according to the present embodiment is set such that the display light 10d made incident on the range extending from the lower point 101c to the upper point 101d is reflected toward a position upper than the eye range ER. In this manner, when the display light 10d is reflected from the windshield 101, the display light 10d is reflected toward a direction different from the eye range ER. In other words, the regulating unit 5 regulates the diffusion angle of the display light 10d to the upper limit angle $\gamma 2$ or less such that the display light 10d reflected from the windshield 101 is directed in a direction different from the eye range ER.

In addition, as explained with reference to FIG. 9, the upper limit angle $\gamma 2$ is determined such that the display image 31 can be visually recognized from all the positions in the eye range ER. As illustrated in FIG. 9, part of the display light 10d made incident on the lower point 101c of the windshield 101 is transmitted through the windshield 101, diffracted by the hologram 2, and serves as diffracted light 30c. The diffracted light 30c is output toward the lower end of the eye range ER. By contrast, part of the display light 10d made incident on the upper point 101d of the windshield 101 is transmitted through the windshield 101, diffracted by the hologram 2, and serves as diffracted light 30d. The diffracted light 30d is output toward the upper end of the eye range ER.

As illustrated in FIG. 5, the display light 10b made incident from the field lens 9 is diffused through the lens 51m, and serves as display light 10m. The upper limit angle $\gamma m$ of the lens 51m is also set such that the display light 10m reflected from the windshield 101 is directed in a direction different from the eye range ER. In addition, the upper limit angle $\gamma m$ is determined such that the display image 31 can be visually recognized from all the positions in the eye range ER.

The vehicle display device 1 configured as described above regulates the reflected light 40 directed to the eye range ER, and improves the visibility of the display image 31. The vehicle display device 1 may be configured to deflect the reflected light 40 to a position lower than the eye range ER. As another example, the vehicle display device 1 may be configured to deflect the reflected light 40 from the eye range ER in the vehicle width direction W, as explained with reference to FIG. 10. FIG. 10 illustrates a plan view of the vehicle 100 as viewed from above.

A lens 51L is a lens 51 disposed at one end of the vehicle width direction W, and disposed, for example, at the left end. The lens 51L regulates the diffusion angle of display light 10L to an upper limit angle $\gamma 3$ or less. The display light 10L is made incident on the windshield 101 within a range extending from a left point 101e to a right point 101f. Part of the display light 10L made incident on the left point 101e is reflected from the windshield 101, and serves as reflected light 40e. Part of the display light 10L made incident on the right point 101f is reflected from the windshield 101, and serves as reflected light 40f.

The upper limit angle γ3 is set such that the display light 10L made incident on the range extending from the left point 101e to the right point 101f is reflected toward a position located on the right side of the eye range ER. Also for the other lenses 51 arranged along the vehicle width direction W, the diffusion angle of the display light 10 is regulated such that the display light 10 is reflected to a position located on the right side of the eye range ER. The regulating unit 5 may be configured to have different upper limit angles according to the position in the image horizontal direction X. For example, the upper limit angle γ3 of the lens 51L may be different from the upper limit angle γ4 of the lens 51 disposed at the right end. The hologram 2 is configured to output the display light 10 as diffracted light 30 directed to the eye range ER.

As explained above, the vehicle display device 1 according to the present embodiment includes the reflection-type hologram 2 disposed inside the windshield 101 of the vehicle 100, and the projection device 3. The projection device 3 includes the image display device 4 outputting the display light 10, and the regulating unit 5 regulating the diffusion angle of the display light 10.

The projection device 3 projects the display light 10 having passed through the regulating unit 5 onto the hologram 2.

The hologram 2 outputs the display light 10 projected from the projection device 3 as diffracted light 30 directed to the eye range ER of the vehicle 100. The regulating unit 5 is configured to regulate the diffusion angle of the display light 10 to the upper limit angle or less such that the display light 10 reflected from the windshield 101 is directed in a direction different from the eye range ER. The vehicle display device 1 according to the present embodiment regulates the reflected light 40 directed to the eye range ER, and improves the visibility of the display image 31.

The regulating unit 5 according to the present embodiment is configured to have the upper limit angle γ differing according to the position in the image vertical direction Y or the position in the image horizontal direction X in the regulating unit 5. For example, the upper limit angle γ1 of the lens 51u, the upper limit angle γm of the lenses 51m, and the upper limit angle γ2 of the lens 51d may be different from each other. The upper limit angle γ of the display light 10 preferably has a large value from the viewpoint of enabling visual recognition of the display image 31 from various positions. By contrast, the upper limit angle γ is preferably set small to prevent the reflected light 40 from being directed to the eye range ER. By setting the values of the upper limit angle different in respective positions of the regulating unit 5, decrease in visibility due to a ghost can be suppressed while the display image 31 is enabled to be visually recognized at least from any position in the eye range ER.

The regulating unit 5 according to the present embodiment is a lens array including a plurality of lenses 51. Each of the lenses 51 has a shape diffusing the display light 10 at a diffusion angle equal to or smaller than the upper limit angle γ. Using the lens array enables individual control of the values of the upper limit angle γ according to the position in the image vertical position Y or the position in the image horizontal position X. For example, the lenses 51 include lenses 51 having mutually different values of the upper limit angle γ.

The projection device 3 according to the present embodiment is disposed such that the display light 10 is reflected from the windshield 101 to a position upper than the eye range ER. The lenses 51 are arranged along the image vertical direction Y. The values of the upper limit angle γ are different according to the positions of the lenses 51 in the image vertical direction Y. When the reflected light 40 is deflected to a position upper than the eye range ER, optimum distribution of values of the upper limit angle γ can be achieved by varying the upper limit angle γ according to the position in the image vertical direction Y.

The value of the upper limit angle γ1 of the lens 51u corresponding to the image upper portion in the lenses 51 according to the present embodiment is smaller than the value of the upper limit angle γ2 of the lens 51d corresponding to the image lower portion in the lenses 51. The display light 10u projected onto the upper portion of the hologram 2 tends to have a smaller incidence angle with respect to the windshield 101 than that of the display light 10d projected onto the lower portion of the hologram 2. To deal with it, by setting the upper limit angle γ1 to a value smaller than that of the upper limit angle γ2, generation of a ghost is suppressed.

In the vehicle display device 1 according to the present embodiment, the field lens 9 may be omitted. An optical system different from the field lens 9 may align the directions of the display light 10b made incident on the regulating unit 5. The regulating unit 5 is not limited to a microlens array. Instead of a microlens array, another optical system regulating the diffusion angle to the upper limit angle γ or less may be used as the regulating unit 5.

Modification of Embodiment

A device different from a laser scanner may be used as the image display device 4. For example, a thin film transistor-liquid crystal display (TFT-LCD), an organic EL display, or a LED array display may be used as the image display device 4. In this case, the regulating unit 5 to regulate the diffusion angle is provided on the front surface of the image display device 4. Examples of the optical element used as the regulating unit 5 include a lens array, a louver, and a lattice filter (stripes).

The details disclosed in the embodiment and the modification described above may be properly carried out in combination.

In the vehicle display device according to the present embodiment, the regulating unit is configured to regulate the diffusion angle of the display light to an upper limit angle or less such that the display light reflected from the windshield is directed in a direction different from the eye range. The vehicle display device according to the present invention produces the effect of directing the reflected light in a direction different from the eye range, and improving the visibility of the display image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
a reflection-type hologram disposed inside a windshield of a vehicle; and
a projection device including an image display device outputting a display light and a regulating unit configured to regulate a diffusion angle of the display light, and to project the display light having passed through the regulating unit onto the hologram, wherein
the hologram outputs the display light projected from the projection device as diffracted light directed to an eye range of the vehicle, and
the regulating unit is configured to regulate the diffusion angle of the display light to an upper limit angle or less such that the display light reflected from the windshield is directed in a direction different from the eye range.

2. The vehicle display device according to claim 1, wherein
the regulating unit is configured to have the upper limit angle differing according to a position in an image vertical direction or a position in an image horizontal direction in the regulating unit.

3. The vehicle display device according to claim 2, wherein
the regulating unit is a lens array including a plurality of lenses, and
each of the lenses has a shape diffusing the display light at a diffusion angle equal to or smaller than the upper limit angle.

4. The vehicle display device according to claim 3, wherein
the lenses include lenses having mutually different values of the upper limit angle.

5. The vehicle display device according to claim 4, wherein
the projection device is disposed such that the display light is reflected from the windshield to a position upper than the eye range,
the lenses are arranged along the image vertical direction, and
values of the upper limit angle are different according to positions of the lenses in the image vertical direction.

6. The vehicle display device according to claim 5, wherein
a value of the upper limit angle of a lens corresponding to an image upper portion in the lenses is smaller than a value of the upper limit angle of a lens corresponding to an image lower portion in the lenses.

7. The vehicle display device according to claim 3, wherein
the projection device is disposed such that the display light is reflected from the windshield to a position upper than the eye range,
the lenses are arranged along the image vertical direction, and
values of the upper limit angle are different according to positions of the lenses in the image vertical direction.

8. The vehicle display device according to claim 7, wherein
a value of the upper limit angle of a lens corresponding to an image upper portion in the lenses is smaller than a value of the upper limit angle of a lens corresponding to an image lower portion in the lenses.

9. The vehicle display device according to claim 1, wherein
the regulating unit is a lens array including a plurality of lenses, and
each of the lenses has a shape diffusing the display light at a diffusion angle equal to or smaller than the upper limit angle.

10. The vehicle display device according to claim 9, wherein
the lenses include lenses having mutually different values of the upper limit angle.

11. The vehicle display device according to claim 10, wherein
the projection device is disposed such that the display light is reflected from the windshield to a position upper than the eye range,
the lenses are arranged along the image vertical direction, and
values of the upper limit angle are different according to positions of the lenses in the image vertical direction.

12. The vehicle display device according to claim 11, wherein
a value of the upper limit angle of a lens corresponding to an image upper portion in the lenses is smaller than a value of the upper limit angle of a lens corresponding to an image lower portion in the lenses.

13. The vehicle display device according to claim 9, wherein
the projection device is disposed such that the display light is reflected from the windshield to a position upper than the eye range,
the lenses are arranged along the image vertical direction, and
values of the upper limit angle are different according to positions of the lenses in the image vertical direction.

14. The vehicle display device according to claim 13, wherein
a value of the upper limit angle of a lens corresponding to an image upper portion in the lenses is smaller than a value of the upper limit angle of a lens corresponding to an image lower portion in the lenses.

* * * * *